US011995286B2

(12) United States Patent
Chang et al.

(10) Patent No.: US 11,995,286 B2
(45) Date of Patent: *May 28, 2024

(54) SYSTEM AND METHOD FOR DISPLAYING CHANGES TO A NUMBER OF ENTRIES IN A SET OF DATA BETWEEN PAGE VIEWS

(71) Applicant: Digits Financial, Inc., San Francisco, CA (US)

(72) Inventors: Wayne Chang, North Andover, MA (US); Jeffrey Hall Seibert, Jr., San Mateo, CA (US); Manuel Deschamps Rascon, Green Cove Springs, FL (US); Mark Eli Moreau Roseboom, Oakland, CA (US)

(73) Assignee: Digits Financial, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/961,057

(22) Filed: Oct. 6, 2022

(65) Prior Publication Data
US 2023/0030735 A1 Feb. 2, 2023

Related U.S. Application Data

(63) Continuation of application No. 17/328,382, filed on May 24, 2021, now Pat. No. 11,604,554, which is a continuation of application No. 16/898,172, filed on Jun. 10, 2020, now Pat. No. 11,054,962, which is a continuation-in-part of application No. 16/716,099, filed on Dec. 16, 2019, now Pat. No. 11,048,378.

(51) Int. Cl.
*G06F 3/0481* (2022.01)

(52) U.S. Cl.
CPC ............................ *G06F 3/0481* (2013.01)

(58) Field of Classification Search
CPC .... G06F 3/0481; G06F 40/106; G06F 40/177; G06F 40/169
See application file for complete search history.

(56) References Cited

U.S. PATENT DOCUMENTS

| 5,303,146 | A | * | 4/1994 | Ammirato | G06F 40/18 715/204 |
|---|---|---|---|---|---|
| 5,339,392 | A | | 8/1994 | Risberg | |
| 6,112,015 | A | | 8/2000 | Planas | |
| 6,799,209 | B1 | | 9/2004 | Hayton | |
| 6,834,306 | B1 | | 12/2004 | Tsimelzon | |
| 8,232,962 | B2 | | 7/2012 | Buck | |
| 8,656,270 | B2 | | 2/2014 | Rui | |
| 9,069,747 | B2 | | 6/2015 | Ueberschaer | |
| 9,350,950 | B2 | | 5/2016 | Carden | |
| 9,489,190 | B1 | | 11/2016 | Wang | |
| 9,836,194 | B2 | | 12/2017 | Hirano | |

(Continued)

OTHER PUBLICATIONS

Anonymous "Detect If Browser Tab Has Focus," Sep. 12, 2011, https://stackoverflow.com/questions/7389328/detect-if-browser-tab-has-focus [retreived on Aug. 11, 2021], 8 pages.

(Continued)

*Primary Examiner* — Cao H Nguyen
(74) *Attorney, Agent, or Firm* — Cesari and McKenna, LLP

(57) ABSTRACT

A system and method for displaying changes to a number of entries between page views is provided.

20 Claims, 11 Drawing Sheets

(56) References Cited

U.S. PATENT DOCUMENTS

| | | | |
|---|---|---|---|
| 10,003,635 | B1 | 6/2018 | Seibert, Jr. |
| 10,331,190 | B2 | 6/2019 | Veiga |
| 10,460,387 | B2 | 10/2019 | Singer |
| 10,528,209 | B2 | 1/2020 | Alcorn |
| 10,691,445 | B2 | 6/2020 | Garg |
| 10,732,789 | B1 | 8/2020 | Marcinelli |
| 10,884,571 | B2 | 1/2021 | Otero |
| 11,013,998 | B2 | 5/2021 | Nishikawa |
| 2002/0166118 | A1 | 11/2002 | Kovan |
| 2003/0210265 | A1 | 11/2003 | Haimberg |
| 2004/0103373 | A1 | 5/2004 | Wei |
| 2006/0037038 | A1* | 2/2006 | Buck ............... G06F 3/1431 725/9 |
| 2008/0091774 | A1 | 4/2008 | Taylor |
| 2008/0155427 | A1 | 6/2008 | Leblay |
| 2008/0215347 | A1 | 9/2008 | Suzuki |
| 2009/0094551 | A1 | 4/2009 | Alkov |
| 2009/0198809 | A1 | 8/2009 | Goto |
| 2011/0161223 | A1 | 6/2011 | Buck |
| 2012/0109813 | A1 | 5/2012 | Buck |
| 2012/0303507 | A1 | 11/2012 | Arnold et al. |
| 2013/0031462 | A1 | 1/2013 | Calvo |
| 2013/0176328 | A1 | 7/2013 | Pillai |
| 2014/0033101 | A1 | 1/2014 | Rein |
| 2014/0049462 | A1 | 2/2014 | Weinberger |
| 2014/0229360 | A1 | 8/2014 | Schluetter et al. |
| 2015/0160976 | A1 | 6/2015 | Kim |
| 2017/0132016 | A1 | 5/2017 | Zilberman |
| 2017/0153889 | A1 | 6/2017 | Joglekar |
| 2018/0307312 | A1 | 10/2018 | Buck |
| 2019/0378434 | A1 | 12/2019 | Bland |

OTHER PUBLICATIONS

Anonymous "Run Javascript Ajax calls only when the page is being viewed", May 23, 2017, https://stackoverflow.com/questions/9174035/run-javascript-ajax-calls-only-when-the-page-is-being-viewed?noredirect+1&1q+1 [retrieved on Aug. 11, 2021], 4 pages.

Anonymous "Page Visibility API—Web APIs MDN", Jun. 5, 2020, https://web.archive.org/web/20200605104323/https://developer.mozilla.org/en-US/docs/Web/API/Page_Visibility_API, [retrieved om Aug. 11, 2021], 8 pages.

International Search Report and Written Opinion dated Aug. 20, 2021 for International Application No. PCT/US2021/032964 filed May 18, 2021 for Digits Financial, Inc., 15 pages.

U.S. Appl. No. 16/716,099, filed Dec. 16, 2019 by Wayne Chang, et al. for System and Method for Tracking Changes Between a Current State and a Last State Seen by a User, pp. 1-40.

U.S. Appl. No. 16/898,172, filed Jun. 10, 2020 by Wayne Chang, et al. for System and Method for Displaying Changes to a Number of Entries in a Set of Data Between Page Views, pp. 1-42.

International Search Report and Written Opinion dated Apr. 12, 2021 for International Application No. PCT/US2020/065269 filed Dec. 16, 2022 for Digits Financial, Inc., 13 pages.

Ross, Margy. Design Tip #152 Slowly Changing Dimension Types 0, 4, 5, 6 and 7. Blog Post at Kimball Group on Feb. 5, 2013. Retrieved from [http://www.kimballgroup.com/2013/02/design-tip-152-slowly-changing-dimension-types-0-4-5-6-7] on [Jul. 29, 2022] 6 pages. (Year 2013).

Stackoverflow. How to detect if a variable has changed. Question posted on Stack Overflow on Mar. 23, 2011. Retrieved from [https://stackoverflow.com/questions/5401527/how-to-detect-if-a-variable-has-changed] in [Mar. 10, 2022]. 4 pages. (Year: 2011).

* cited by examiner

| Overbudget Line Items ~505 | Variance ~510 |
|---|---|
| COGS ~515A | $15,000.00 ~515B |
| Office Expense ~520A | $7,500.00 ~520B |
| Advertising ~525A | $5,000.00 ~525B |
| Total ~550A | $27,500.00 ~550B |

| Overbudget Line Items — 505 | Variance — 510 |
|---|---|
| COGS — 515A | $20,000.00 — 515B |
| Office Expense — 520A | $7,500.00 — 520B |
| Advertising — 525A | $5,000.00 — 525B |
| Total — 550A | $32,500.00 — 550B |

FIG. 5E

| | 610 | 615 | 620 |
|---|---|---|---|
| 605 | | | |
| COGS | 20,000.00 | 15,000.00 | X |
| OFFICE EXPENSE | 7,500.00 | 7,500.00 | X |
| ADVERTISING | 5,000.00 | | |
| ... | ... | ... | ... |

FIG. 6

SYSTEM AND METHOD FOR DISPLAYING CHANGES TO A NUMBER OF ENTRIES IN A SET OF DATA BETWEEN PAGE VIEWS

CROSS-REFERENCE TO RELATED APPLICATIONS

The present application is a continuation of commonly assigned copending U.S. patent application Ser. No. 17/328,382, which was filed on May 24, 2021, by Wayne Chang, et al. for SYSTEM AND METHOD FOR DISPLAYING CHANGES TO A NUMBER OF ENTRIES IN A SET OF DATA BETWEEN PAGE VIEWS, which is a continuation of commonly assigned copending U.S. patent application Ser. No. 16/898,172, which was filed on Jun. 10, 2020, by Wayne Chang, et al. for SYSTEM AND METHOD FOR DISPLAYING CHANGES TO A NUMBER OF ENTRIES IN A SET OF DATA BETWEEN PAGE VIEWS, now issued as U.S. Pat. No. 11,054,962 on Jul. 6, 2021, which is a continuation-in-part of commonly assigned copending U.S. patent application Ser. No. 16/716,099, which was filed on Dec. 16, 2019, by Wayne Chang et al. for SYSTEM AND METHOD FOR TRACKING CHANGES BETWEEN A CURRENT STATE AND A LAST STATE SEEN BY A USER, now issued as U.S. Pat. No. 11,048,378 on Jun. 29, 2021, all of which are hereby incorporated by reference.

BACKGROUND

Technical Field

The present invention relates generally to the display of information and, more particularly to alerting a user to changes that have occurred to one or more sets of displayed information.

Background Information

In software systems, graphical user interfaces (GUIs) are often utilized to display one or more sets of data to a user in an easy to read manner. Such GUIs may be utilized in a variety of differing computer software environments including, e.g., monitoring/control systems, engineering systems, financial systems, etc. For example, in a monitoring/control system, a GUI may display temperatures, pressures, flow rates etc. In an exemplary financial system, a GUI may display various financial measures, such as, e.g., revenue, expenses, financial ratios, etc. More generally, the GUI may display a set of data that corresponds to the results of a query of, e.g., a database. For example, a GUI window associated with a human resources timekeeping application may display the set of all employees who have worked sufficient hours in a pay period that they are now due overtime. This may be conceptualized as the result of the query to a database to identify all workers who have worked, e.g., 40+ hours in this work week. During operation, as employees' time worked is entered into the system, the set of employees to whom overtime is due may increase. Alternatively, if a new work week begins, the set may reset to an empty set. Again, this may be conceptualized as returning a null set when a query is sent to identify all workers who have worked, e.g., 40+ hours in this work week.

Typically, systems may continuously update the entries of sets of data displayed in substantially real time to enable a user to see the current set of data. A noted disadvantage of such substantially real time updating of a GUI window is that a user's focus may have left the window while an update occurs. For example, a user may have a GUI window displaying a set of data open, but then minimize that window to perform some other action in a different window. When the GUI window is reopened, no indication is made if the display set of data has changed. This presents a noted disadvantage in that a user is left to rely on his or her memory to determine if the set of data has changed while his or her focus was elsewhere. This may result in the user missing an important change. For example, a user may miss that a particular employee is now due overtime and put the employee on the work schedule, thereby increasing labor costs.

SUMMARY

The noted disadvantages of the prior art are overcome by providing a system and method for displaying changes to a set of data between page views. In operation, when a set of data, such as the results of a query to a database, is displayed in a graphical user interface (GUI) window, the system records the entries that have been displayed in a status data structure. Should the system detect that a user's focus has shifted from the GUI window and then returned at a later point in time, the system determines if any changes to the entries of the set of data have occurred while the user's focus was not on the GUI window. If there are entries that have changed (i.e., has been added or deleted), the system highlights the changed entries to alert the user that entries have changed while his or her focus was not on the window.

Advantageously, the one or more embodiments described herein provide an improvement in the configuration and operation of GUIs by displaying changes to a set of data between page views. Specifically, by highlighting those entries that changed during the time when the user's focus was away from the GUI, the one or more embodiments described herein ensure that the user does not miss relevant updates/changes to the entries in the GUI, and can instead quickly and easily understand such changes when the user's focus has returned to the GUI. Therefore, and by keeping track of the changes in the manner described herein, the systems and methods provide an improvement in the configuration and operation of GUIs.

BRIEF DESCRIPTION OF THE DRAWINGS

The above and further advantages of the present invention may be better understood in relation to the accompanying figures, in which like reference numerals indicate identical or substantially identical elements, of which:

FIG. 5C is a view of an exemplary GUI window illustrating an exemplary set of data in a third state in accordance with an illustrative embodiment of the present invention;

FIG. 5E is a view of an exemplary GUI window illustrating an exemplary set of data in a fifth state in accordance with an illustrative embodiment of the present invention;

FIG. 6 is a diagram of an exemplary status data structure used to store a user's last seen state in accordance with an illustrative embodiment of the present invention.

DETAILED DESCRIPTION OF AN ILLUSTRATIVE EMBODIMENT

Figure 1:
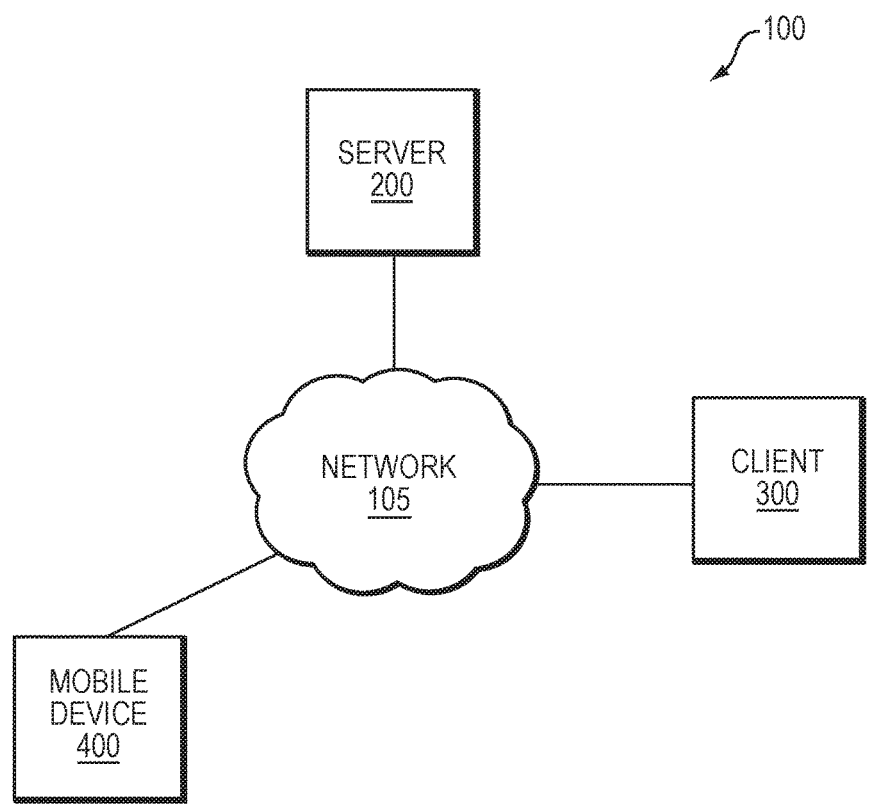
FIG. 1 is a schematic block diagram of an exemplary network environment in accordance with an illustrative embodiment of the present invention.

FIG. 1 is a schematic block diagram of an exemplary computer network environment 100 in accordance with an illustrative embodiment of the present invention. Specifically, the network environment 100 comprises of a network 105 that is operatively interconnected with one or more servers 200, clients 300, and/or mobile devices 400. It should be noted that network 105 is illustratively shown as a single network entity. However, it is expressly contemplated that network 105 may comprise of a plurality of interconnecting networks of the same and/or differing types, including, e.g., Wi-Fi networks, cellular telephone networks, local area networks (LANs), and/or wide area networks (WANs) including, for example, the well-known Internet. The various network connected entities typically communicate over the network 105 by exchanging discrete frames or packets of data according to predefined protocols, such as a Transmission Control Protocol/Internet Protocol (TCP/IP), Hypertext Transfer Protocol (HTTP), etc. Thus, for example, in an illustrative embodiment, a mobile device 400 may communicate using a cellular telephone network to transmit data. The exemplary cellular telephone network may then be interconnected with the Internet, which is further connected to a LAN, which ultimately is operatively connected to server 200.

Exemplary servers 200, described below in reference to FIG. 2, may execute an application that produces a graphical user interface (GUI) when communicating with software executing on a client 300 or mobile device 400. Client computer 300, described further below in reference to FIG. 3, may comprise a user's computer that executes an application in accordance with an illustrative embodiment of the present invention. In alternative embodiments of the present invention, client computer 300 may communicate in a client-server relationship with server 200 to access an application executing on the server. In other alternative embodiments of the present invention, client computer 300 may execute a web browser that accesses server 200 to display information relating to an application.

Figure 4:
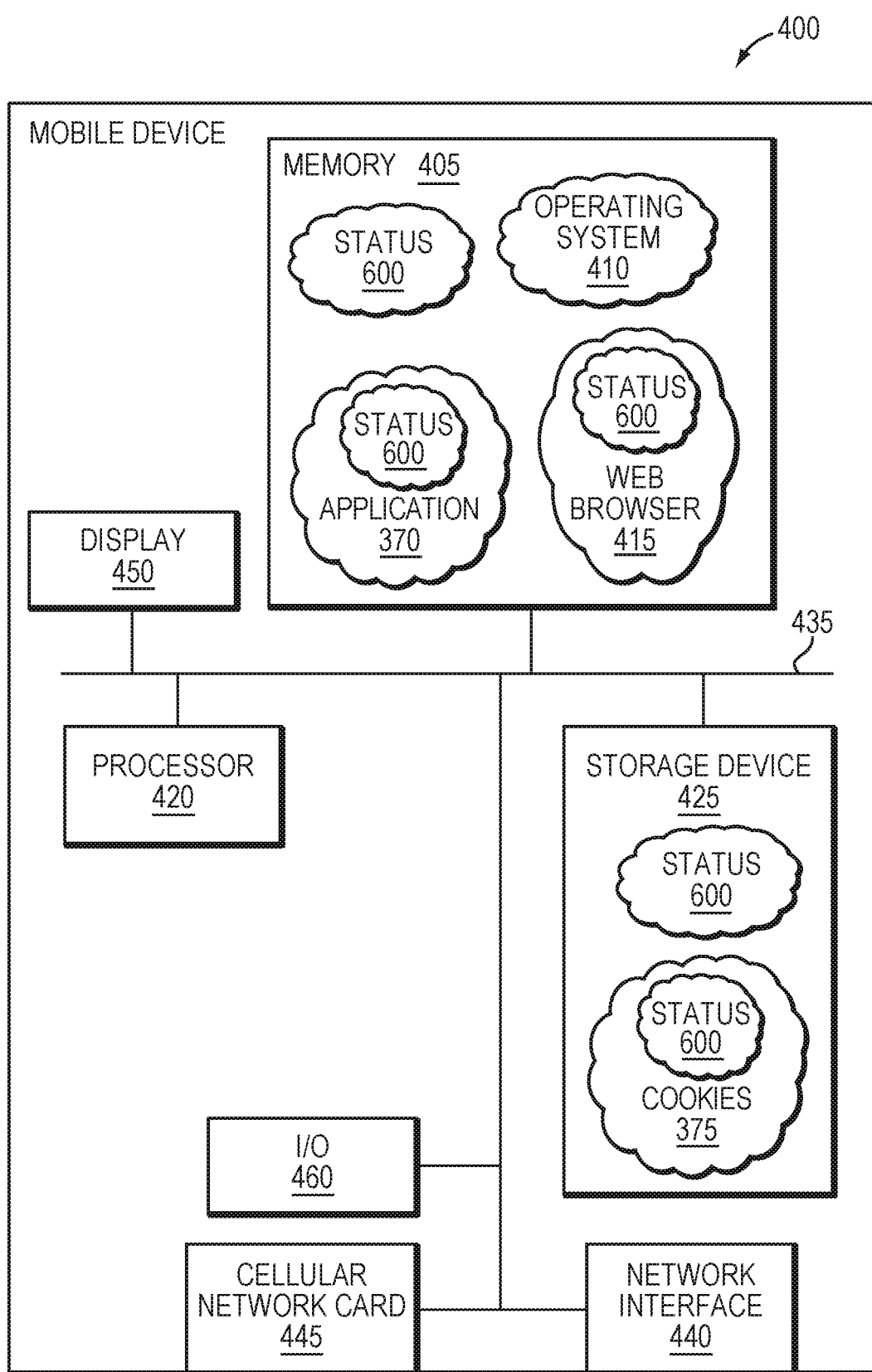
FIG. 4 is a schematic block diagram of an exemplary mobile device in accordance with an illustrative embodiment of the present invention.

Mobile device 400, described further below in reference to FIG. 4, is also illustratively operatively connected to network 105. Illustratively, mobile device 400 may comprise a smart phone, a personal digital assistant and/or a tablet computer. More generally, mobile device 400 may comprise any movable device capable of executing applications and/or accessing the worldwide web (WWW) via, e.g., a web browser.

Further, it should be noted that while a single server 200, client 300, and mobile device 400 are described and illustrated, in alternative embodiments of the present invention, a plurality of such network entities may be utilized. Therefore, the description and illustration of a single server 200, client 300, and/or mobile device 400 should be taken as exemplary only.

Figure 2:
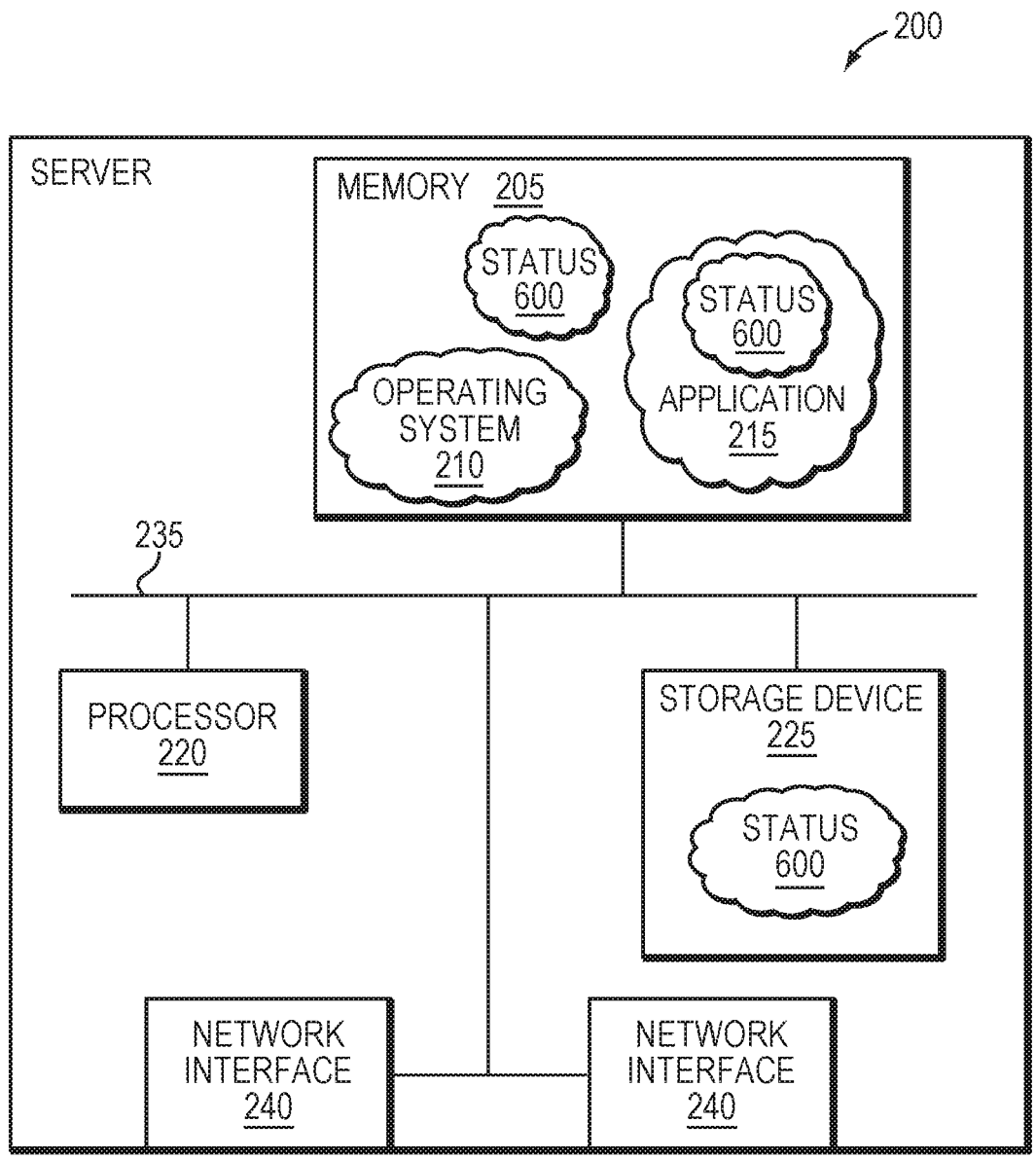
FIG. 2 is a schematic block diagram of an exemplary server system in accordance with an illustrative embodiment of the present invention.

FIG. 2 is a schematic block diagram of an exemplary server 200 in accordance with an illustrative embodiment of the present invention. The server 200 may illustratively comprise of one or more network interfaces 240, one or more processors 220, one or more storage devices 225, and a memory 205 operatively interconnected by a system bus 235.

The network interface 240 illustratively contains the mechanical, electrical, and signaling circuitry for communicating data over physical links coupled to a network. The network interface may be configured to transmit and/or receive data using a variety of different communication protocols, including, inter alia, TCP/IP, UDP, ATM, SONET, HTTP, wireless protocols, Frame Relay, Ethernet, Fiber Distributed Data Interface (FDDI), etc. Notably, a physical network interface 240 may also be used to implement one or more virtual network interfaces, such as for Virtual Private Network (VPN) access, as is known to those skilled in the art.

The memory 205 comprises a plurality of locations that are addressable by the processor(s) 220 and the network interface 240 for storing software programs and data structures associated with the various embodiments described herein. The processor 220 may comprise necessary elements or logic adapted to execute software programs and manipulate data structures. An operating system 210, portions of which are typically resident in memory 205 and executed by the processor(s), functionally organizes the server 200 by, inter alia, invoking network operations in support of software processes and/or services executing on the server. An application 215, portions of which may be resident in memory 205, is executed by the processor to implement various functionality, such as an engineering monitoring system, a financial accounting system, etc. The descriptions and illustrations contained herein are directed towards an exemplary application 215 that implements a financial accounting system. However, it should be noted that it is expressly contemplated that the application 215 may implement other types of systems. Therefore, the description of a financial accounting system application 215 should be taken as exemplary only.

In accordance with an illustrative embodiment of the present invention, the application processes various data in accordance with user commands and, in part, displays a GUI containing one or more sets of data, each of which may have one or more entries, with each entry being associated with a value such as financial accounts, ratios, etc. In an illustrative embodiment, the GUI illustratively may be displayed on a web page on a user computer 300 and/or mobile device 400. In alternative embodiments, the GUI may be displayed by an application executing on computer 300 and/or mobile device 400. Therefore, the various descriptions of sets of data being displayed in a GUI window and the location of that window should be taken as exemplary only.

It should be noted that in an illustrative embodiment of the present invention, the application 215 may be configured to operate in a client/server manner in which the application 215 executes on the server, but displays set(s) of data on a client 300 and/or mobile device 400. In alternative embodiments of the present invention, the application 215 may interact with a web server (not shown) executing on server 200 to provide data or information accessible via a web browser that may be executed on, e.g., client 300 or mobile device 400.

The storage device 225, which may be internal or external to the server 200, stores data associated with the operating system 210 and application 215. In alternative embodiments, storage device 225 may comprise a plurality of devices, which may be internal and/or external to server 200. Storage device 225 may comprise a cloud-based storage, RAID array, etc. in accordance with alternative embodiments of the present invention. In accordance with an illustrative embodiment of the present invention, the storage device 225 stores a status data structure 600, described further below in reference to FIG. 6.

The status data structure illustratively stores the set of data that has been displayed in a GUI window to a user. In alternative embodiments, the status data structure 600 also stores the last seen states of one or more entries that are tracked in accordance with illustrative embodiments of the present invention. These alternative embodiments are described in the above-incorporated U.S. Patent Application. The status data structure 600 is illustratively shown as being stored on storage device 225. However, it should be noted that it is expressly contemplated that the status data structure 600 may be stored within memory 205 during execution of the application 215. In accordance with an illustrative embodiment of the present invention, storage of status information 600 on server 200 enables the application 215 to synchronize information across web browsers, devices, etc. For example, a user may view an exemplary GUI window on a mobile device, close the application on the mobile device, and then launch a web browser on a computer. Storage of status information 600 on the server 200 would enable application 215 to track information in such an environment.

Further, in alternative embodiments, the status data structure 600 may be stored within the application 215 and/or in memory 205. Depending on a particular embodiment and desired implementation, the status data structure 600 may be stored in a variety of locations on server 200. Further, in alternative embodiments, the status data structure 600 may not be stored on server 200. Instead, in alternative embodiments, the status data structure 600 may be stored on client 300 and/or mobile device 400. Therefore, the description of the status data structure 600 being stored on storage device 225 should be taken as exemplary only and not limiting. More generally, the status data structure 600 may be stored in any form of storage that may be accessed by the application and/or web browser displaying an application generated GUI to implement illustrative embodiments of the present invention.

In alternative embodiments of the present invention, the various functionalities may be distributed among a plurality of servers. As such, the description of a single server 200 should be taken as exemplary only. Also, while the embodiments herein are described in terms of processes or services implemented as software executing on a processor, alternative embodiments may include the processes described herein being embodied as modules consisting of hardware, software, firmware, and/or combinations thereof. Therefore, the description of software applications should be taken as exemplary only.

Figure 3:
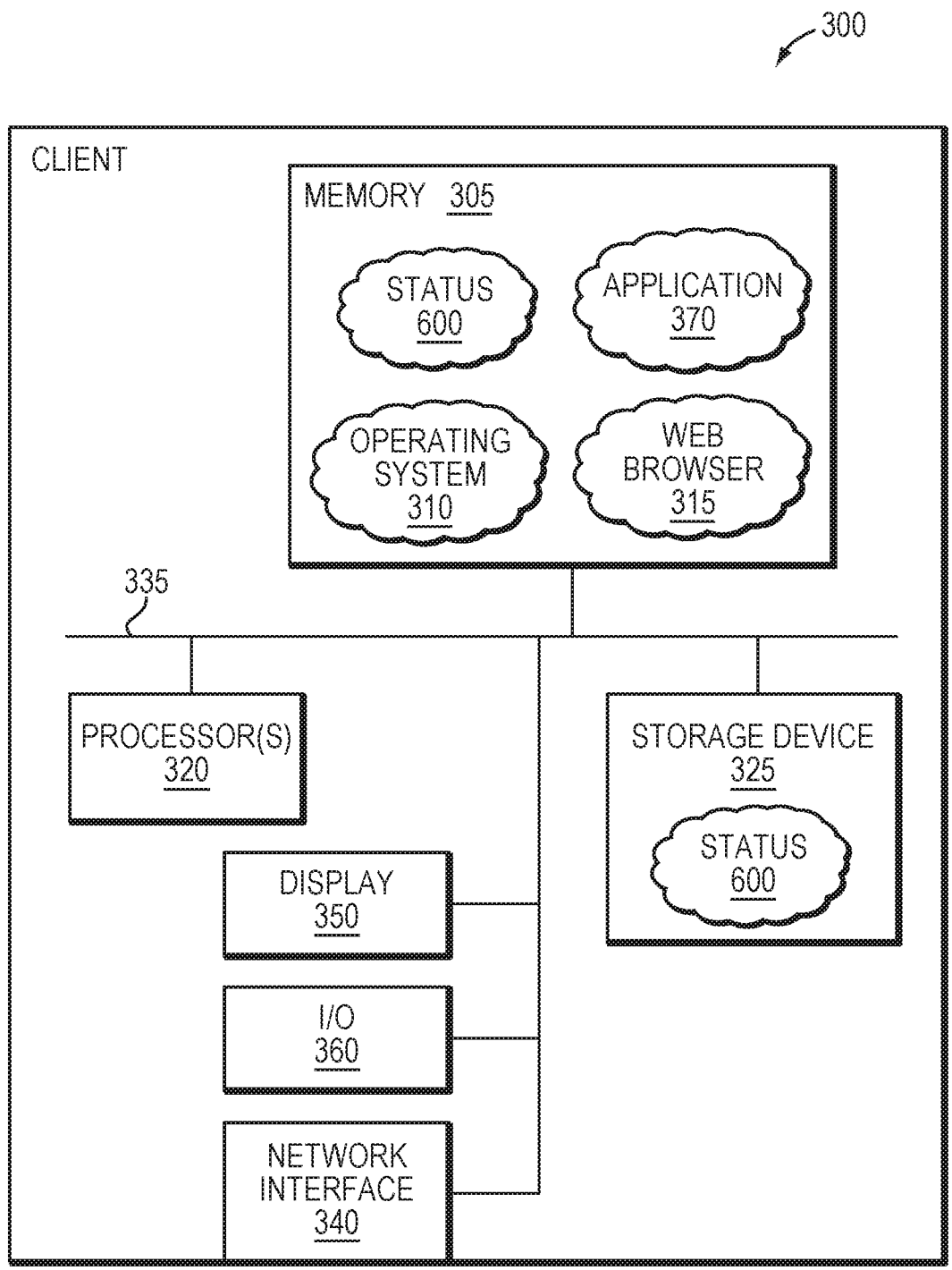
FIG. 3 is a schematic block diagram of an exemplary client computer system in accordance with an illustrative embodiment of the present invention.

FIG. 3 is a schematic block diagram of an exemplary client computer system 300 in accordance with an illustrative embodiment of the present invention. The client computer system 300, illustratively comprises a memory 305, one or more processors 320, one or more storage devices 325, a network interface 340, a display 350, and one or more forms of input/output (I/O) 360 that all operatively interconnected by a system bus 335. Memory 305, processors 320, storage device 325, and network interface 340 illustratively perform similar functions as described above in relation to server 200.

The display 350 may illustratively comprise a conventional liquid crystal display (LCD) or light emitting diode (LED) computer monitor or other visual display as are known to those skilled in the art. The I/O system 360 may comprise, for example, a keyboard, mouse, light pen, touchscreen and/or other forms of inputting data and manipulating GUI elements in accordance with various embodiments of the present invention. In one illustrative embodiment, the I/O may comprise a keyboard and mouse that may be utilized to enter data and to rearrange a plurality of GUI windows.

Memory 305 stores an operating system 310. A web browser 315 enables a user of the client computer system 302 to access a webpage provided by application 215. Illustratively, the web browser 315 accesses a webpage provided by application 215 via web server (not shown) executing on server 200. In accordance with an illustrative embodiment of the present invention, the web browser 315 implements the well-known JavaScript. In an illustrative embodiment, the status data structure 600 is stored within the localStorage implemented by JavaScript. In such embodiments, the localStorage may be stored on storage device 325. However, web browser 315 may retain a copy of the status data structure 600 in memory 305 for use in replaying actions, etc. In alternative embodiments, the status data structure 600 may be stored in cookies 370 within storage device 325, or in memory 305 of the computer 300. As will be appreciated by those skilled in the art, status data structure 600 may be stored in a plurality of locations at once. For example, an in-memory copy may exist for ready access by web browser 315 or application 370, but a persistent copy may be stored on storage device 325 to enable tracking across reboots, new sessions, etc. Any known synchronization techniques may be utilized to maintain consistency among various copies of status data structure 600.

In alternative embodiments, a local version of the application 370 may be stored in memory 305 and executed by processor 320. In such exemplary embodiments, status data structure 600 may be stored in memory 305 and/or on persistent storage 325. In accordance with alternative embodiments, the local application 370 may utilize the same persistent status data structure 600 stored on storage device 325 as is used by web browser 315. This enables, e.g., a user to use the application 370 and change to web based-use using the browser 315 in a seamless manner.

FIG. 4 is a schematic block diagram of an exemplary mobile device 400 in accordance with an illustrative embodiment of the present invention. As noted above, mobile device 400 may comprise any device capable of executing applications and/or accessing the World Wide Web. Illustratively, mobile device 400 may comprise a smart phone, a personal digital assistant (PDA), and/or a tablet computer. The mobile device 400 illustratively comprises network interfaces 440, one or more processors 420, a memory 405, a storage device 425, and a cellular network card 445 interconnected by a system bus 435.

Memory 405, processor 420, storage device, I/O 460, and network interface 440 function similarly to those components described above. Display 450 may comprise a touch-screen that is used for both display and input purposes. Cellular network card 445 may implement the circuitry to enable the mobile device to access one or more cellular networks for, e.g., data transmission and reception.

Memory 405 stores an operating system 410. Similarly to that described above in reference to FIG. 3, status data structure 600 may be stored in a variety of locations on mobile device 400. As noted above, in an illustrative embodiment, the status information may be stored in JavaScript's localStorage on storage device 425. However, it is expressly contemplated that the status data structure 600 may be stored in other locations. Therefore, description of status data structure 600 being noted in storage device 425 should be taken as exemplary only.

An exemplary flow chart that outlines the steps of implementing an illustrative embodiment of the present invention is described below in relation to FIG. 7. FIGS. 5A-E illustrate various exemplary GUI windows showing the operation of an illustrative embodiment of the present invention.

Figure 5A:
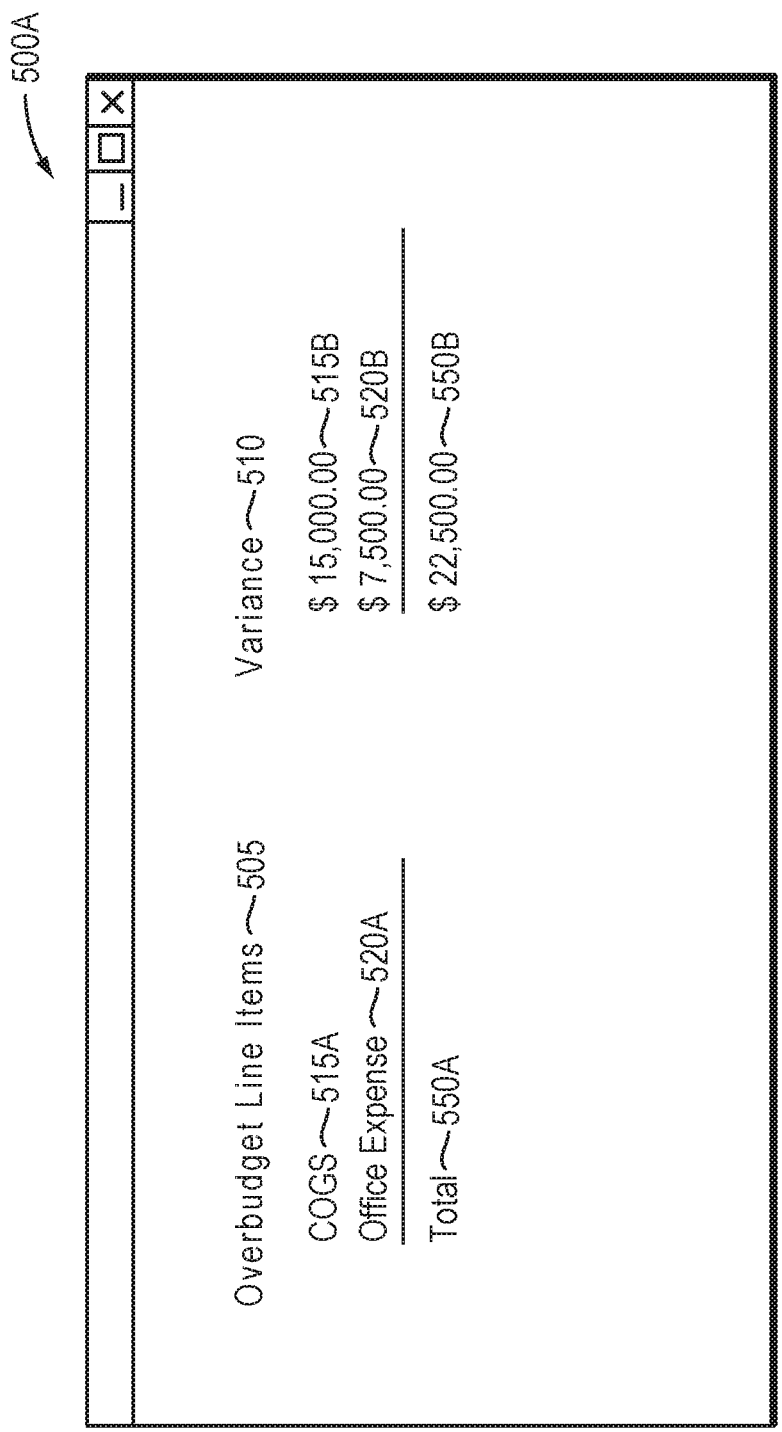
FIG. 5A is a view of an exemplary graphical user interface (GUI) window illustrating an exemplary set of data in a first state in accordance with an illustrative embodiment of the present invention.

FIG. 5A is an exemplary graphical user interface (GUI) window 500A (GUI) illustrating an exemplary financial application's display in a first state in accordance with an illustrative embodiment of the present invention. The window 500A illustratively displays a set of data that includes one or more entries associated with various financial reporting accounts. In the example of a financial application, one set of data may comprise a list of overbudget line items 505. Each entry in the set of data may include a value, illustrated in window 500A as the variance 510. That is, for each entry in set 505, there is a corresponding value 510. The set of overbudget line items 505 may include exemplary entries for Cost of Goods Sold (COGS) 515A and Office Expense 520A. The Variance entries 510 includes a COGS variance 515B having an exemplary value of $15,000.00 and an Office Expense variance 520B having a value of $7,500. The window 500A may also display a Total 550A line with associate value 550B.

It should be noted that the number, types, names, and arrangement of the various entries and/or values are shown for illustrative purposes only. As will be appreciated by those skilled in the art, an exemplary GUI window may have an almost limitless number of configurations. Further, while the values of entries are shown as having a numeric value, in accordance with alternative embodiments of the present invention, the values may be in alternative formats, e.g., text, graphical, etc. Therefore, the description and illustration of values being numerical should be taken as exemplary only. The particular layout and arrangement of the various components of the exemplary GUI window 500A should be taken as exemplary only. In accordance with various illustrative embodiments of the present invention, the components and/or layout of window 500A may be varied as is known by those skilled in the art.

Illustrative window 500A may be displayed while a user is actively monitoring the window, i.e., has the user's focus on the window. During such time, any updates to the number of entries and/or their associated values will be shown in substantially real time within window 500A. Assume that at some point in time, the system detects that the user has shifted focus from window 500A. This may occur by, e.g., JavaScript executing within a web browser detecting that there has been no mouse movement or keystrokes for some time period, by detecting that the window 500A has been closed, etc. As will be appreciated by those skilled in the art, there are a plurality of techniques to determine whether a user has shifted focus from a window. Further, depending on a particular implementation, e.g., web browser, application executing on a computer, app executing on a mobile device, etc., differing techniques may be available depending on information that may be obtained from the computer system environment, operating system, etc. Any such technique may be utilized in alternative embodiments of the present invention.

Figure 5B:
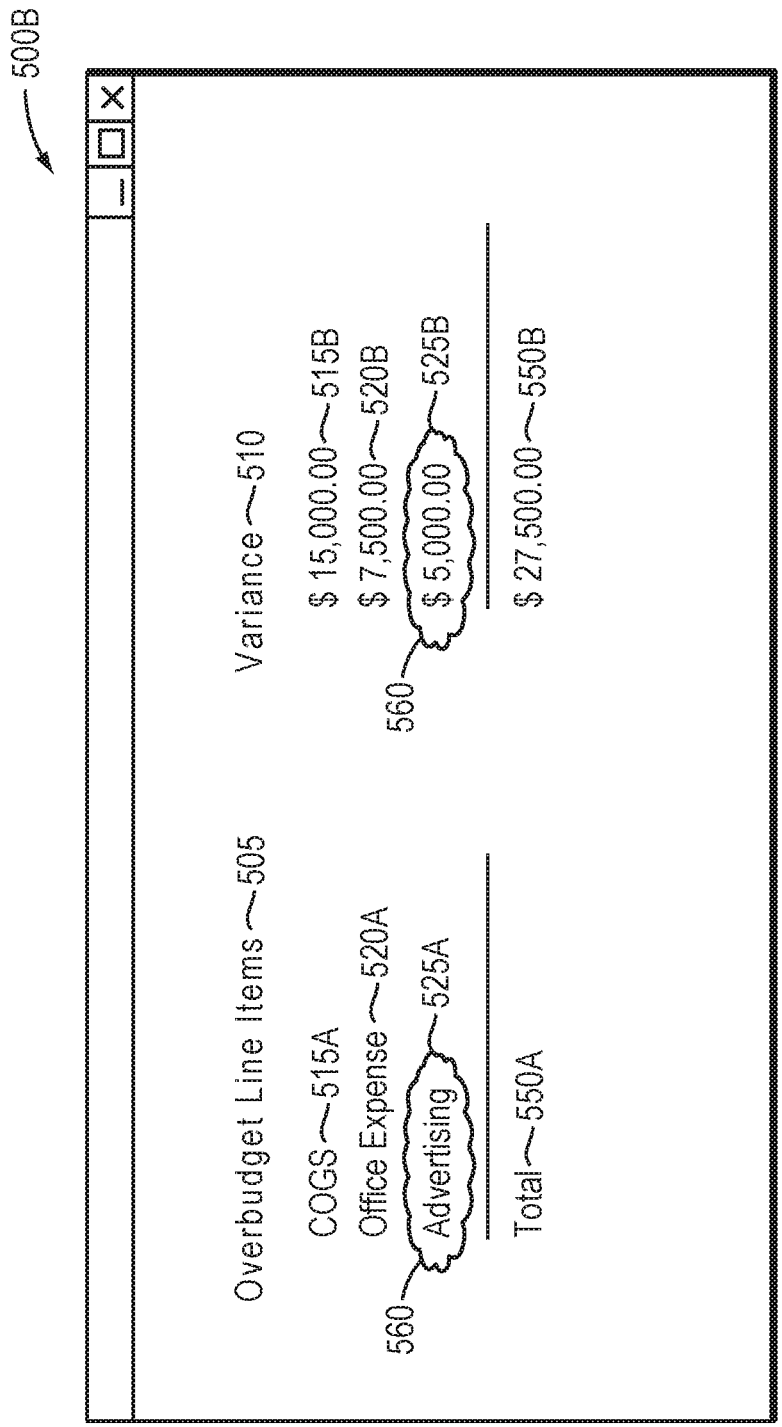
FIG. 5B is a view of an exemplary GUI window illustrating an exemplary set of data in a second state in accordance with an illustrative embodiment of the present invention.

FIG. 5B is a diagram illustrating an exemplary GUI window 500B in a second state in accordance with an illustrative embodiment of the present invention. The second state as shown in window 500B is representative of the system illustrating an alert to the user when the user's focus has returned to the window after one or more entries have been added/removed to one or more of the sets of data being displayed. In accordance with an illustrative embodiment of the present invention, exemplary window 500A would be displayed and, at some point in time, the system detects that the user's focus has left window 500A. For example, while the user's focus is not on window 500A, additional spending is recorded in the exemplary financial accounting application so that the Advertising spending is now over budget. In prior art implementations, an indication that Advertising is now overbudget and the amount overbudget would be updated on screen in real time, which would result in the user missing notifications that the number of entries in the set of data has changed. In accordance with an illustrative embodiment of the present invention, when it is detected that the user's focus has returned to window 500, the system will present an alert to the user to highlight the addition/removal of entries in the set of data. In accordance with an illustrative embodiment of the present invention, the alert may comprise the entries flashing or being animated to draw the user's attention to the new entry. In the case of an entry being removed from a set of data, the entry may be animated to show it slowly fading away. If a plurality of entries have been added and/or removed from the set(s) of data being displayed, the notifications may occur simultaneously or may be staggered.

In the example described herein and shown in relation to FIG. 5B, a new entry for Advertising 525A and associated variance value 525B of $5,000 have been added to the sets of data being displayed. Illustratively, and alert 560, such as flashing text or animation is being displayed for a predefined time period after the user's focus has returned to the window. As noted above, the alert may be implemented using any of a variety of techniques. Therefore, the description of flashing text or an animation should be taken as exemplary only.

FIG. 5C is a diagram illustrating an exemplary GUI window 500C in a third state in accordance with an illustrative embodiment of the present invention. In window 500C, the alert for the addition of exemplary entries 525A and 525B has completed. Exemplary window 500C represents the new steady state display until an entry or value changes.

Figure 5D:
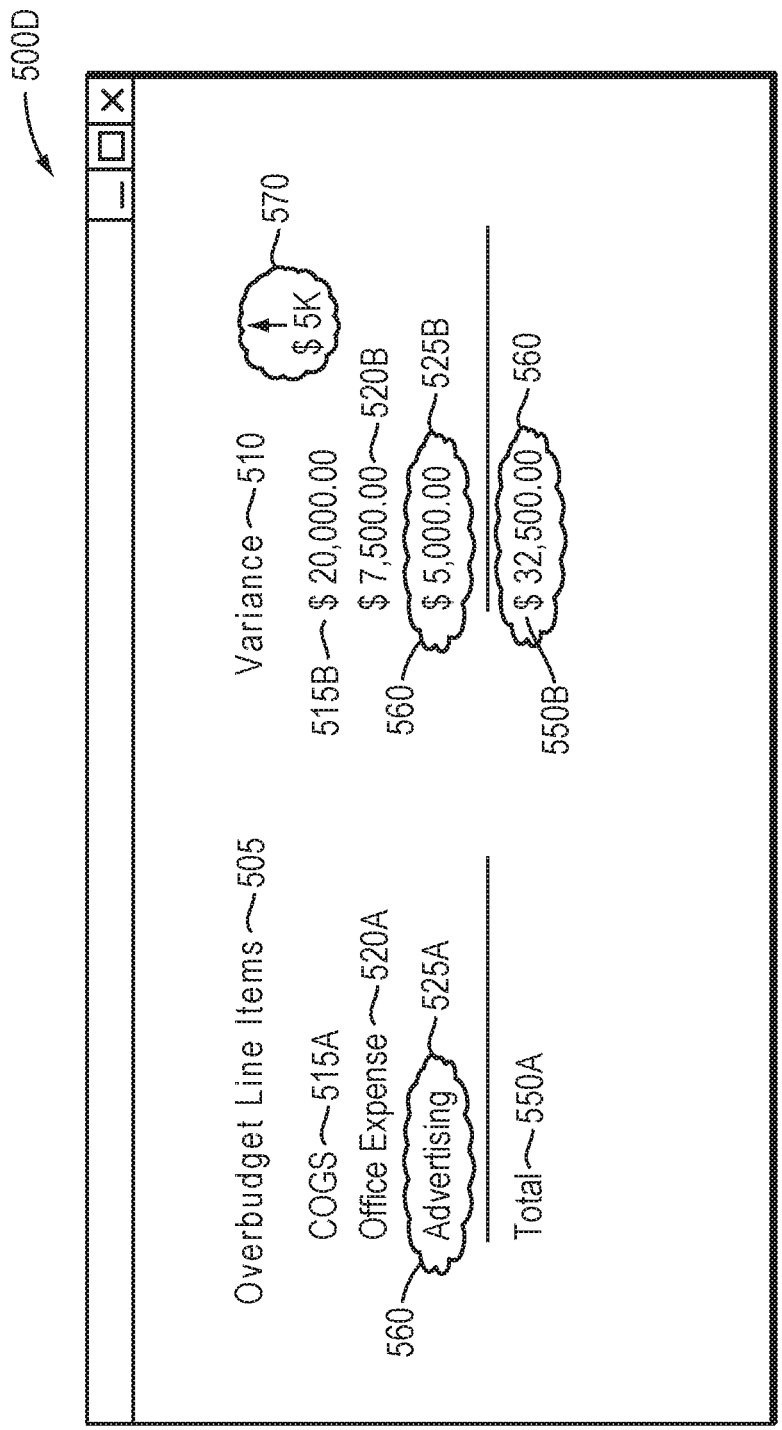
FIG. 5D is a view of an exemplary GUI window illustrating an exemplary set of data in a fourth state in accordance with an illustrative embodiment of the present invention.

FIG. 5D is a diagram illustrating an exemplary GUI window 500D in a fourth state in accordance with an illustrative embodiment of the present invention. Exemplary window 500D illustrates a window that is showing alerts that the number of entries in a data set has changed and that the values of entries that were in the data set being displayed have changed. Assume that window 500A is initially shown to a user. The user's focus then shifts from the window. During the time that the user's focus has shifted, the Advertising line item has gone overbudget. The display when the user returns his focus to the window is shown above in relation to FIGS. 5B and 5C. However, if during the time that the user's focus is not on the GUI window, the Advertising line item is added to the set of line items that is overbudget and the amount that the COGS is overbudget is increased, exemplary window 500D illustrates an exemplary result of the present invention when the user's focus is returned to the window.

Exemplary window 500D shows the addition of the Advertising entry 525A and its corresponding value 525B ($5,000). Alerts 560 are also displayed showing that these entries have changed since the user's focus was last on the window. Additionally, a change in value alert 570 is shown that indicates that the COGS variance 515B has increased from $15,000 to $20,000. In an illustrative embodiment, the alert 570 may comprise of an illustrated arrow and value indicator showing the direction (up/down) and magnitude ($5,000) of the change in value.

FIG. 5E is a diagram illustrating an exemplary GUI window 500E in a fifth state in accordance with an illustrative embodiment of the present invention. Exemplary window 500E shows an end state after illustrative alerts 560, 570 have completed. Window 500E illustrates a new steady state.

It should be noted that in alternative embodiments, the exemplary animations or alerts described and shown above in relation to FIGS. 5A-E may occur simultaneously to reduce the time required to get to the current state. Similarly, in alternative embodiments, one or more values may be animated simultaneously, and then a second group of one or more values may be animated, etc. Groups may be selected based on the relationships among entries and/or values, which may be predetermined by the application or, in alternative embodiments, may be user configurable.

FIG. 6 is an exemplary data structure 600 for storing status information in accordance with an illustrative embodiment of the present invention. It should be noted that exemplary data structure 600 is shown for illustrative purposes only. In accordance with alternative embodiments of the present invention, the status information may be retained within application 215, or elsewhere. Further, in alternative embodiments of the present invention, the information described as being contained within the status data structure 600 may be stored in a variety of differing data structure formats. For example, in an illustrative embodiment where the status information is stored in localStorage of JavaScript running within a web browser, the information would be stored in the format defined by localStorage. Similarly, should the status information be stored in cookies accessible by a web browser, the information would be stored in that format.

Illustratively, status data structure 600 is used to store the last state of particular values that have been seen by a user as well as an indication of whether a particular entry of a set of data has been seen by the user. That is, the status data structure enables the system to track whether a user has seen a particular entry, or whether the entry was added to the set of data while the user's focus was not on the window. In alternative embodiments, it also stores the current state of values. However, in other alternative embodiments of the present invention, the current state of values is acquired from the application 215 and is not stored with the last seen state. Therefore, the description of status data structure 600 should be taken as exemplary only.

Illustratively, status data structure 600 comprises of four columns, an entry column 605 that identifies which entry each row is associated therewith, a current value column 610, a last seen value column 615, and a previously seen entry column 620. Each exemplary row of the data structure 600 is associated with a particular entry that is tracked in accordance with illustrative embodiments of the present invention. Utilizing the exemplary GUI window 500A, as described above, status data structure 600 may have exemplary rows including Cost of Goods Sold (COGS) 625, Office Expense 630, Advertising 635, and in alternative embodiments, additional and/or differing rows 640. As is illustrated in exemplary data structure 600, row 625 representative of COGS, column 610 shows a value of $20,000, which is representative of the current value of that entry, as is illustrated in window 500D/E. In row 625, a value of $15,000 is stored in the last seen value column 615. As the stored value in column 610 differ from column 615, the system has tracked that the current value of this entry is different from the last seen value. This change in value is illustrated above in relation to FIGS. 5A-5E.

Column 620 includes an indicator in row 625 that illustrates that the entry 625 has been previously seen by the user. In row 635, representing Advertising, column 620 does not contain an indicator. This is representative of the addition of the Advertising row 635 to the status data structure 600 while the user's focus was not on window 500. As described further below in relation to FIG. 7, the system may utilize indicator 620 to determine if an entry has been added to the set of data while the user's focus was elsewhere. Exemplary data structure 600 lacks and indicator for the Advertising entry 635, which corresponds to the addition of Advertising as an entry, as shown and described above in relation to FIGS. 5A-E.

In alternative embodiments of the present invention, indicator column 620 may include a further indicator that signifies that the entry has been deleted from the set of data since the user's focus left the window. In further alternative embodiments of the present invention, the status data structure 600 may store additional information. For example, the status data structure 600 may store an intermediate value, i.e., a value that is between the last seen value and the current value. Such intermediate values may be utilized to enable the system to highlight the change from a last seen value to the intermediate value before updating to the current value. An example of where an intermediate value may be desirable is if the intermediate value exceeds some threshold. In such an alternative embodiment, upon detection of the user's focus returning to the window, the system may highlight the change between the last seen value and the intermediate value to alert the user that a threshold was exceeded, albeit potentially on a temporary basis. Further, the storage of intermediate values may enable the system to replay changes between two arbitrary points in time. In alternative embodiments, such intermediate states may not be stored in status data structure 600, but may be recreated by application for display to use. Therefore, the description of storage of one or more intermediate states should be taken as exemplary only.

In accordance with an illustrative embodiment of the present invention, the system may monitor mouse movements and/or keystroke to determine whether a user's focus has shifted. In alternative embodiments, detection of the closure of an application on a mobile device, closing/opening a GUI window, etc. may also be used to detect whether a user's focus has left and/or returned to the dashboard. As will be appreciated by those skilled in the art, there are a plurality of techniques that may be used to determine a user's focus. It is expressly contemplated that the principles of the present invention may be used with any such technique.

Figure 7:
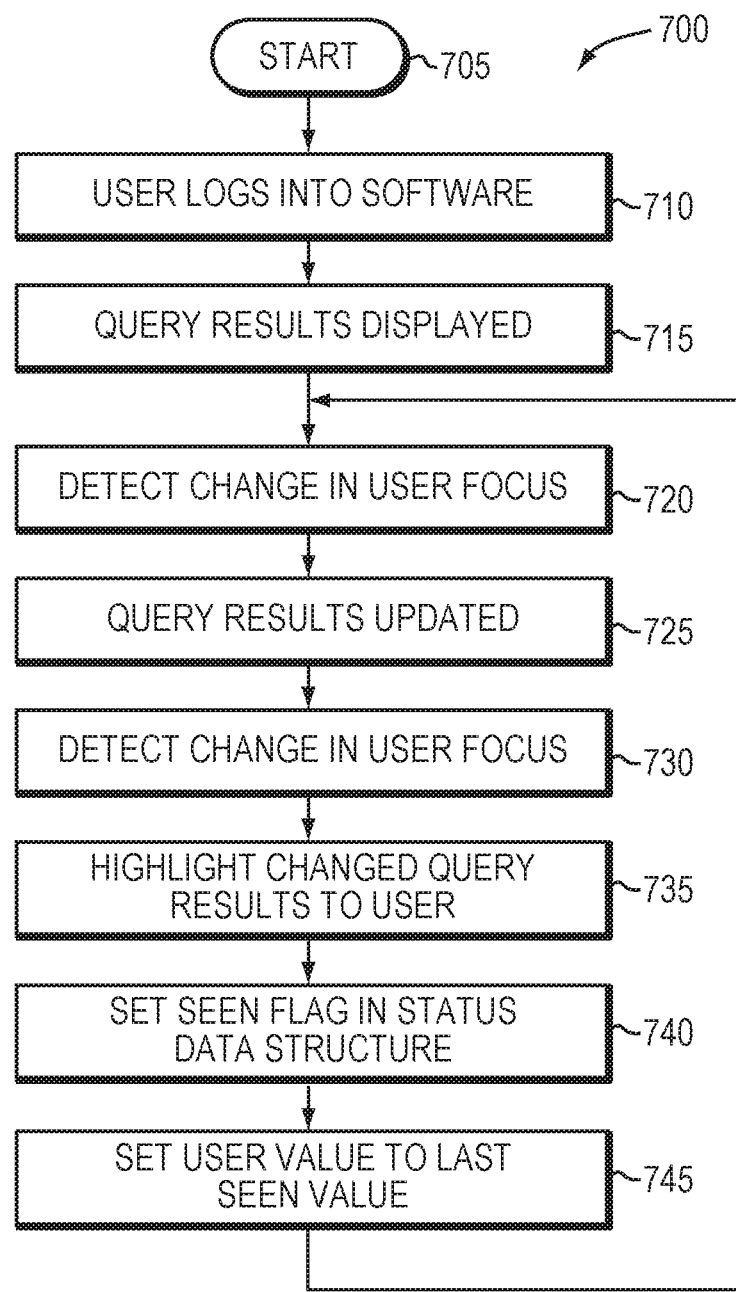
FIG. 7 is a flowchart detailing the steps of a procedure for alerting a user of changes to a set of data after focus has shifted from a GUI window in accordance with an illustrative embodiment of the present invention.

FIG. 7 is a flowchart detailing the steps of a procedure 700 for alerting a user in accordance with an illustrative embodiment of the present invention. The procedure 700 begins in step 705 continues to step 710 where user logs into or initiates an application. This may comprise executing an application locally on a user's computer or mobile device, or may comprise logging into an application executing on a server. During operation of the application, a set of data, that may be conceptualized as the results of a query, is displayed to the user in step 715. Illustratively set of data may be displayed in a window via a web browser or on a locally executing application.

At some later point in time, the system detects a change in the user focus in step 720. A change in the user focus may be caused by for example, a user minimizing the window, closing the application, moving another window on a display so that it covers the window displaying the set of data, bringing a new application to the front when utilizing a mobile device, etc. As noted above, the system may monitor mouse movements and/or keystrokes to determine whether a user's focus has left the window. For example, if no mouse movements have occurred within a predefined time period, the system may make the determination that the user has changed focus from the window.

While the system is detecting that user's focus is not on the window, the results to the query are updated in step 725. This may occur because of the normal operation of the application. That is, during operation of the application, transactions may be processed in a financial system, new data is received in a monitoring system, etc. Using the example shown above in relation to FIGS. 5A-E, by normal operation of the system, Advertising has now exceeded its budget, so that the Advertising line item is now part of the query results of line items that are currently over budget.

At some later point in time the system detects the change in user focus back to the application in step 730. As noted above, the system may use any of a variety of differing techniques to detect that a user's focus has returned to the application. Examples include, e.g., detection of mouse and/or keyboard activity, opening an application, maximizing a window, etc. It is expressly contemplated that the loss of focus may be a user logging out of an application, or otherwise closing the application, and the return of focus is the user logging back into the application and/or initializing the application. This may occur by the user logging out and logging into different devices or instantiations of the application. For example, a user may be using an app on a mobile device an then close the app. The user may then log into a web page for the app using a computer. Therefore, all such examples of loss of focus and return of focus should be taken as examples that are expressly contemplated in accordance with alternative embodiments of the present invention. It is expressly contemplated that any technique for detecting that focus has returned to the application or GUI window may be utilized in alternative embodiments of the present invention. Therefore, the examples given should be viewed as exemplary only and not limiting.

In response, the system highlights the changed query results to the user in step 735. Similarly, in alternative embodiments, a change in value (from a previously seen value to the current value) may also be highlighted in step 735. In an exemplary embodiment of the present invention, the highlighting of the changed query results, i.e., the addition/deletion of entries from the set of data, and/or the changed values may comprise changing the color of and/or animating the entry/value. As described above in relation to FIGS. 5A-5E, in an illustrative embodiment, values may be animated in a serial manner while an icon is displayed to show the delta (change and direction) between the last seen state and the current state. Similarly, the addition of an entry may be highlighted in any manner such as, e.g., animations, audio alerts, flashing text, changes in color, etc. In alternative embodiments, all changed entries and/or values may be animated at once. In further alternative embodiments, one or more groups of entries/values may be animated simultaneously, with other groups being animated serially. More generally, the system may be configured to highlight the changes to the user in any manner when his or her focus has returned to the application.

It should be noted that in alternative embodiments of the present invention, the technique to highlight the change in entries and/or values may vary. As such, the description of changing the color of and/or animating the changed entry/value should be taken as exemplary only.

The procedure then continues to step 740 where the seen flag/indicator 620 is set in the status data structure 600. The indicator 620 alerts the system that this particular entry has been seen by the user, so that if the user's focus leaves the window and returns, the system knows that the user has already seen this entry.

In step 745, the system then sets the user value to the last seen value. The procedure then loops back to step 720.

Further, while this description has been written in terms of a financial software system, the principles of the present invention may be utilized with any form of software system that displays information in a graphical user interface. As such, the description of a financial system should be taken as exemplary only. While various components have been described as being implemented in hardware or software, it should be noted that it is expressly contemplated any of the functionality described herein may be implemented in hardware, software, firmware, or a combination thereof.

What is claimed is:

1. A computer implemented method, comprising the steps of:

creating a status data structure for tracking value changes displayed in a window, wherein the status data structure includes a plurality of data structure entries, wherein a particular data structure entry of the plurality of data structure entries has a single record for recording at least a last seen value;

displaying, on a display screen, the window including a particular data entry associated with the particular data structure entry;

detecting that a user has shifted a focus from the window;

in response to detecting that the user has shifted the focus from the window:

updating the status data structure for the particular data entry, wherein the updating includes recording a particular last seen value for the particular data entry in the particular data structure entry of the status data structure, and determining that an additional data entry is generated and within the window;

detecting that the user has shifted the focus back to the window; and in response to detecting that the user has shifted the focus back to the window:

determining a particular current value of the particular data entry, highlighting one or more changes to the particular data entry when the particular last seen value in the particular data structure entry is different from the particular current value, and highlighting the additional data entry.

2. The computer implemented method of claim 1, wherein detecting that the user has shifted the focus from the window comprises detecting that an input device has not been utilized for a predetermined amount of time.

3. The computer implemented method of claim 1, wherein detecting that the user has shifted the focus from the window comprises detecting that the user has minimized the window.

4. The computer implemented method of claim 1, wherein detecting that the user has shifted the focus back to the window comprises detecting that an application associated with the window has been initialized.

5. The computer implemented method of claim 1, wherein highlighting the one or more changes comprises animating the one or more changes associated with the particular data entry.

6. The computer implemented method of claim 1, wherein highlighting the one or more changes comprises displaying one or more intermediate values between the particular last seen value and the particular current value.

7. The computer implemented method of claim 1, wherein the status data structure is stored in JavaScript localStorage.

8. The computer implemented method of claim 1, wherein the status data structure is stored in a storage device associated with a mobile device.

9. The computer implemented method of claim 1, further comprising highlighting a selected data entry in response to determining that an indicator in a selected data structure entry for the selected data entry indicates that the selected data entry was deleted when the user has shifted the focus from the window.

10. A device comprising:
a processor;
a web browser executing on the processor, the web browser including a window; and
software executing on the processor, the software configured to:
maintain a status data structure for tracking value changes displayed in a window, wherein the status data structure includes a plurality of data structure entries, wherein a particular data structure entry of the plurality of data structure entries records at least a last seen value;
display, on a display screen, the window including a particular data entry associated with the particular data structure entry;
detect that a user has shifted a focus from the window;
in response to detecting that the user has shifted the focus from the window:
update the status data structure for the particular data entry, wherein the updating includes recording a particular last seen value for the particular data entry in the particular data structure entry of the status data structure, and
determine that an additional data entry is generated and within the window;
detect that the user has shifted the focus back to the window; and
in response to detecting that the user has shifted the focus back to the window:
determine a particular current value of the particular data entry, highlight one or more changes to the particular data entry when the particular last seen value in the particular data structure entry is different from the particular current value, and highlight the additional data entry.

11. The device of claim 10, wherein detecting that the user has shifted the focus from the window comprises detecting that an input device has not been utilized for a predetermined amount of time.

12. The device of claim 10, wherein detecting that the user has shifted the focus from the window comprises detecting that the user has minimized the window.

13. The device of claim 10, wherein detecting that the user has shifted the focus back to the window comprises detecting that an application associated with the window has been initialized.

14. The device of claim 10, wherein highlighting the one or more changes comprises animating the one or more changes associated with the particular data entry or displaying one or more intermediate values between the particular last seen value and the particular current value.

15. The device of claim 10, where the software is further configured to store, in the status data structure, an additional data structure entry for the additional data entry.

16. The device of claim 10, wherein the status data structure is stored in JavaScript localStorage.

17. The device of claim 10, wherein the status data structure is stored in a storage device associated with a mobile device.

18. The device of claim 10, wherein the software is further configured to highlight a selected data entry in response to determining that an indicator in a selected data structure entry for the selected data entry indicates that the selected data entry was deleted when the user has shifted the focus from the window.

19. One or more non-transitory computer-readable media, having stored thereon instructions that when executed by a computing device, cause the computing device to perform operations comprising:
creating a status data structure for tracking value changes displayed in a window, wherein the status data structure includes a plurality of data structure entries;
displaying, on a display screen, the window including a particular data entry corresponding to a particular data structure entry of the plurality of data structure entries of the status data structure;
detecting that a user has shifted a focus from the window;
in response to detecting that the user has shifted the focus from the window:
updating the status data structure for the particular data entry by recording a particular last seen value for the particular data entry in the particular data structure entry of the status data structure, and
determining that an additional data entry is generated and within the window;
detecting that the user has shifted the focus back to the window; and
in response to detecting that the user has shifted the focus back to the window, highlighting the additional data entry.

20. The non-transitory computer-readable media of claim 19, wherein detecting that the user has shifted the focus from the window comprises detecting that an input device has not been utilized for a predetermined amount of time.

* * * * *